United States Patent
Fukai et al.

(10) Patent No.: US 10,496,062 B2
(45) Date of Patent: Dec. 3, 2019

(54) PROGRAMMABLE CONTROLLER FOR CONTROLLING AUTOMATIC MACHINES, HAVING CPU TO RECEIVED CONTROL WITH RESPECT TO OWN APPARATUS, WHEN EXTERNAL STORAGE IS AUTHENTICATED BASED ON AUTHENTICATION INFORMATION

(71) Applicant: Kabushiki Kaisha Toshiba, Minato-ku, Tokyo (JP)

(72) Inventors: Eigo Fukai, Nakano Tokyo (JP); Makoto Toko, Tokorozawa Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 15/034,465

(22) PCT Filed: May 12, 2014

(86) PCT No.: PCT/JP2014/062605
§ 371 (c)(1),
(2) Date: May 4, 2016

(87) PCT Pub. No.: WO2015/079725
PCT Pub. Date: Jun. 4, 2015

(65) Prior Publication Data
US 2016/0282830 A1 Sep. 29, 2016

(30) Foreign Application Priority Data
Nov. 27, 2013 (JP) ................................. 2013-245387

(51) Int. Cl.
G05B 19/42 (2006.01)
G05B 19/042 (2006.01)
G05B 19/05 (2006.01)

(52) U.S. Cl.
CPC ......... *G05B 19/0423* (2013.01); *G05B 19/05* (2013.01); *G05B 2219/21005* (2013.01); *G05B 2219/24161* (2013.01)

(58) Field of Classification Search
CPC ................ G05B 19/0423; G05B 19/05; G05B 2219/21005
See application file for complete search history.

(56) References Cited

U.S. PATENT DOCUMENTS 4,742,443 A 5/1988 Rohn et al.
5,392,424 A 2/1995 Cook
(Continued)

FOREIGN PATENT DOCUMENTS

| CN | 1061478 A | 5/1992 |
| CN | 1475883 A | 2/2004 |

(Continued)

OTHER PUBLICATIONS

Translation of WO2007116798A1 (also published as JP4759048) is attached, 2007.*

(Continued)

*Primary Examiner* — Mushifique Siddique
(74) *Attorney, Agent, or Firm* — Knobbe, Martens, Olson & Bear, LLP

(57) ABSTRACT

A programmable controller according to an embodiment includes a connection interface, a storage, and a controller. The connection interface can be connected with an external storage. The storage stores information for authentication. The controller accepts control for the programmable controller when the external storage is connected to the connection interface and the external storage is authenticated based on identification information stored in the external storage and the information for authentication.

3 Claims, 9 Drawing Sheets

(56) References Cited

U.S. PATENT DOCUMENTS

| | | | |
|---|---|---|---|
| 5,404,456 A | 4/1995 | Kawabe et al. | |
| 7,246,270 B2 | 7/2007 | Nagano et al. | |
| 7,286,885 B2* | 10/2007 | Niwa | G05B 19/058 700/17 |
| 8,060,925 B2* | 11/2011 | Yoshii | G06F 12/1466 709/225 |
| 8,285,954 B2 | 10/2012 | Yano et al. | |
| 2003/0225813 A1 | 12/2003 | Nagano et al. | |
| 2004/0181296 A1* | 9/2004 | Muneta | G05B 19/05 700/21 |
| 2004/0193874 A1* | 9/2004 | Kanazawa | G06F 21/10 713/161 |
| 2005/0034128 A1 | 2/2005 | Nagashima et al. | |
| 2005/0055109 A1 | 3/2005 | Nagashima et al. | |
| 2007/0055863 A1* | 3/2007 | Araki | G05B 19/058 713/151 |
| 2007/0300289 A1* | 12/2007 | Tanizawa | H04L 63/029 726/3 |
| 2008/0120726 A1* | 5/2008 | Tsunehiro | G06F 21/77 726/27 |
| 2009/0005884 A1* | 1/2009 | Ikegami | G05B 19/058 700/18 |
| 2010/0138591 A1 | 6/2010 | Yano et al. | |
| 2012/0196654 A1* | 8/2012 | Jin | H04L 63/0853 455/558 |
| 2012/0265838 A1 | 10/2012 | Nakano | |
| 2012/0311305 A1 | 12/2012 | Kobayashi et al. | |
| 2014/0188981 A1 | 7/2014 | Shi et al. | |
| 2014/0331014 A1 | 11/2014 | Liao | |
| 2015/0128100 A1 | 5/2015 | Foisy et al. | |
| 2016/0370780 A1* | 12/2016 | Hara | G05B 19/0423 |

FOREIGN PATENT DOCUMENTS

| | | | |
|---|---|---|---|
| CN | 1580997 A | 2/2005 | |
| CN | 1591253 A | 3/2005 | |
| CN | 101681316 A | 3/2010 | |
| CN | 102636987 A | 8/2012 | |
| CN | 102859453 A | 1/2013 | |
| JP | 3038279 B2 | 2/2000 | |
| JP | 2000-149080 A | 5/2000 | |
| JP | 2000-357011 A | 12/2000 | |
| JP | 2003-167606 A | 6/2003 | |
| JP | 2004-213412 A | 7/2004 | |
| JP | 3709315 B2 | 8/2005 | |
| JP | 2006-317990 A | 11/2006 | |
| JP | 2010-176545 A | 8/2010 | |
| JP | 5279534 B2 | 5/2013 | |
| JP | 2013-156871 A | 8/2013 | |
| JP | 2015-103186 A | 6/2015 | |
| WO | WO 2007/116798 A1 | 10/2007 | |

OTHER PUBLICATIONS

U.S. Appl. No. 15/116,648, Programmable Controller and Arithmetic Processing System, filed Aug. 4, 2016.

International Search Report and Written Opinion (JP language only) mailed by Japan Patent Office dated Jun. 30, 2015 in the corresponding PCT Application No. PCT/JP2015/062091 (for U.S. Appl. No. 15/116,648)—9 pages.

Concise Explanation for JP Publication No. 2015-103186 (BAI for U.S. Appl. No. 15/116,648)—1 page.

International Search Report mailed by Japan Patent Office dated Jun. 3, 2014 in the corresponding PCT Application No. PCT/JP2014/062605—4 pages.

Written Opinion mailed by Japan Patent Office dated Jun. 3, 2014 in the corresponding PCT Application No. PCT/JP2014/062605 (Japanese language only)—5 pages.

The First Office Action mailed by The State Intellectual Property Office of People's Republic of China dated Feb. 21, 2017 in the corresponding Chinese Application No. 201480036921.1.

\* cited by examiner

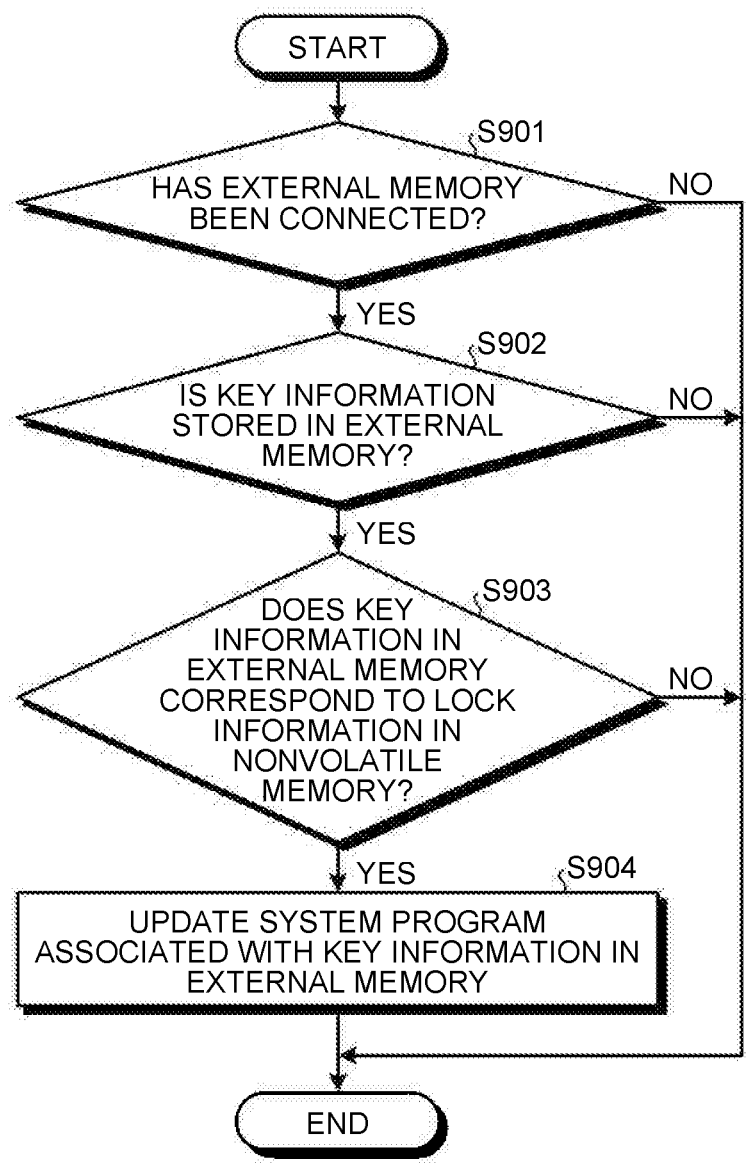

PROGRAMMABLE CONTROLLER FOR CONTROLLING AUTOMATIC MACHINES, HAVING CPU TO RECEIVED CONTROL WITH RESPECT TO OWN APPARATUS, WHEN EXTERNAL STORAGE IS AUTHENTICATED BASED ON AUTHENTICATION INFORMATION

CROSS-REFERENCE TO RELATED APPLICATIONS

This application is national stage application of International Application No. PCT/JP2014/062605, filed May 12, 2014, which designates the United States, incorporated herein by reference, and which is based upon and claims the benefit of priority from Japanese Patent Application No. 2013-245387, filed Nov. 27, 2013, the entire contents of which are incorporated herein by reference.

FIELD

Embodiments described herein relate generally to a programmable controller.

BACKGROUND

Programmable controllers have been used to control various kinds of machines such as automatic machines in factories and public facilities and familiar machines. The programmable controllers include a mechanism to receive information from sensors of the machines as input information for calculation and output command values to actuators of the machines.

A substantial difference in configuration between the programmable controllers and general-purpose PCs is in that the programmable controllers include a special LSI for operation commands to operate an MPU with a low clock frequency, and thus do not rise to high temperatures unlike the general-purpose PCs. Further, they do not incorporate fans having short product life. Therefore, typically, severe restrictions are imposed on the sizes of built-in programmable controllers.

As described above, compared with the normal general-purpose PCs, the programmable controllers are required to have a higher operating environment temperature, and a real-time performance (to terminate a calculation within a given period to complete input/output to/from an I/O) and to be a smaller in size.

Further, the smaller the programmable controllers in size, the wider variety of applications to which they are applied. Because of this, in recent years the downsizing of the programmable controllers has progressed.

However, the programmable controllers need to incorporate an emergency stop switch and an LED that indicates their states. In a small size programmable controller, operation switches have to be arranged with a narrower interval, therefore, it becomes difficult to operate the switches from outside.

Further, conventionally a method of switching an operation to be executed has been proposed. However, it is difficult for users to perform a switching operation with a small operation element, and users may unintentionally touch the operation element and cause an erroneous operation.

BRIEF DESCRIPTION OF DRAWINGS

FIG. 9 is a flowchart illustrating a process of connecting the external memory to the programmable controller according to the third embodiment.

DETAILED DESCRIPTION

In general, according to an embodiment, a programmable controller includes a connection interface unit, a storage, and a controller. The connection interface unit can be connected with an external storage. The storage stores information for authentication. The controller accepts control for the own device when the external storage is connected to the connection interface unit and the external storage is authenticated based on identification information stored in the external storage and the information for authentication.

Exemplary embodiments of a programmable controller will be explained below in detail with reference to the accompanying drawings. The present invention is not limited to the following embodiments.

First Embodiment

Figure 1:
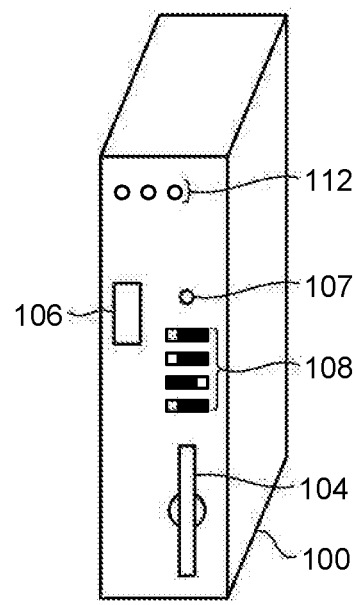
FIG. 1 is a diagram illustrating an example of the exterior of a programmable controller according to a first embodiment.

FIG. 1 is a diagram illustrating an example of the exterior of a programmable controller in the first embodiment. As illustrated in FIG. 1, a programmable controller 100 of the first embodiment includes a switch group (an emergency stop switch 107, a small switch group 108) used for emergency stop, an LED group 112 that indicates a state of the controller, a communication I/F (for example, a USB connector) for connecting with an external device, and an external memory card slot 104 serving as an interface that connects with an external memory (for example, an SD card).

When a machine (system) to be controlled by the programmable controller is a large-scale machine, the accuracy of a sensor for detecting a state of the machine varies. Therefore, the programmable controller 100 of the present embodiment is configured to receive information from various kinds of connected sensors and accumulate the information in the external memory through the external memory card slot 104. Then, a user removes the external memory containing the information from the programmable controller 100 and examines the information stored in the external memory, to be thereby able to monitor the machine (system) in addition to checking the states of the sensors.

The programmable controller 100 is downsized from conventional ones. That is, the external memory card slot 104 for connecting to the external memory occupies a larger area on a front operation panel. The external memory card slot 104 cannot be made smaller so that other structures (for example, the small switch group 108) have to be installed in a small space. However, it is difficult for the user to operate the small switches. For this reason, the programmable controller 100 of the present embodiment is configured to implement a switch function by attachment/detachment of the external memory to/from the external memory card slot 104.

Figure 2:
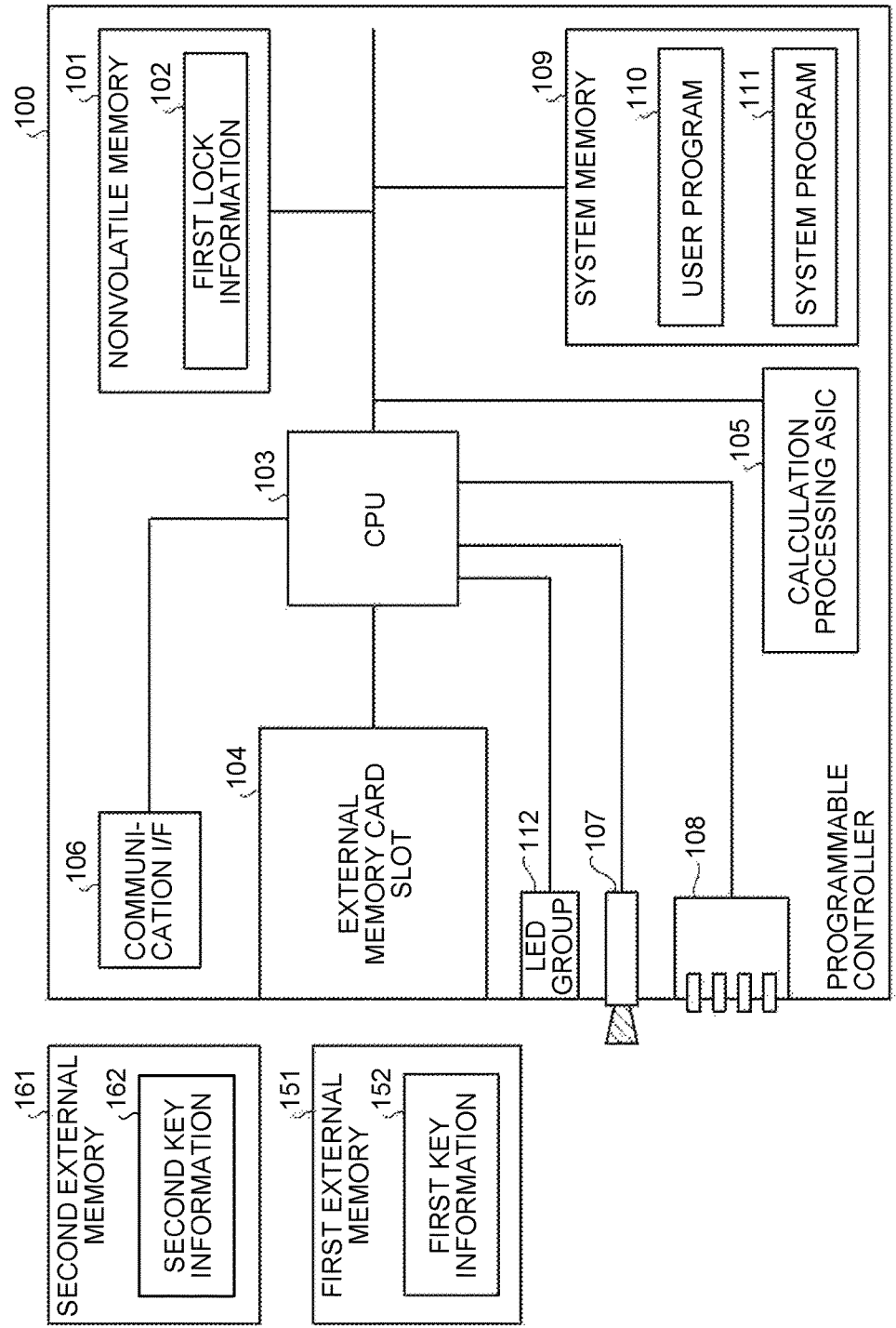
FIG. 2 is a block diagram illustrating the configurations of the programmable controller of the first embodiment and an external memory.

FIG. 2 is a block diagram illustrating the configurations of the programmable controller of the first embodiment and the external memory. As illustrated in FIG. 2, the programmable controller 100 includes a nonvolatile memory 101, a CPU 103, the external memory card slot 104, a calculation ASIC 105, a communication I/F 106, the emergency stop switch 107, the small switch group 108, a system memory 109, and the LED group 112.

The external memory card slot 104 functions as a connection interface that can be connected with a first external memory 151 and a second external memory 161. The CPU 103 can detect the first external memory 151 and the second external memory 161 connected to the external memory card slot 104.

The calculation ASIC 105 is an electronic circuit provided to perform calculations on the basis of which the programmable controller 100 controls a machine.

The communication I/F 106 is an interface that can communicate with an external device connected to the programmable controller 100 (for example, an engineering tool).

The emergency stop switch 107 is a switch for stopping the programmable controller 100 or a device controlled by the programmable controller 100 in the case of emergency. The small switch group 108 is a switch group for controlling the programmable controller 100. The emergency stop switch 107 of the present embodiment not always remains controllable, and controllability and non-controllability thereof is switchable according to the external memory connected to the external memory card slot 104. In other words, the emergency stop switch 107 is controllable only when the external memory corresponding to the programmable controller 100 is connected to the external memory card slot 104. Accordingly, the programmable controller can improve security.

The nonvolatile memory 101 stores first lock information 102. The first lock information 102 is unique to the programmable controller 100 and calculated based on unique values such as a serial number of the programmable controller 100 or a MAC address. Note that the first lock information 102 may be written after calculated by the CPU 103 or may be calculated by the external device connected through the communication I/F 106 and written to the nonvolatile memory 101. The first lock information 102 is used for authentication of the external memory connected to the external memory card slot 104.

The system memory 109 stores a user program 110 and a system program 111. The system program 111 is executed upon startup of the CPU 103 such as an OS or firmware. The user program 110 operates on the system program 111 and corresponds to the machine controlled by the programmable controller 100.

The CPU 103 controls the entire programmable controller 100. For example, the CPU 103 controls the nonvolatile memory 101, the system memory 109, the calculation ASIC 105, and the LED group 112 connected through a bus.

Further, the CPU 103 executes the user program 110 as needed after executing the system program 111 stored in the system memory 109 at the time of startup.

The CPU 103 performs various types of control by the executed system program 111, in other words, functions as a controller. For example, the CPU 103 detects the external memory connected or not connected to the external memory card slot 104.

The CPU 103 then determines whether key information is stored in the external memory connected to the external memory card slot 104.

First key information 152 stored in the first external memory 151 is used for authentication between the first external memory 151 and the programmable controller as a connection destination.

In the present embodiment, when the first external memory 151 is connected to the external memory card slot 104, the CPU 103 determines for authentication whether the connected first external memory 151 corresponds to the programmable controller 100 on the basis of the first key information 152 stored in the first external memory 151 and the first lock information 102 stored in the nonvolatile memory 101 of the programmable controller 100. When the key information is not stored in the connected first external memory 151, the programmable controller 100 does not accept a user's control (operation to the emergency stop switch 107 or the small switch group 108).

The programmable controller 100 of the present embodiment can accept the user's control (operation to the emergency stop switch 107 or the small switch group 108) when the external memory is appropriately authenticated by the CPU 103.

Meanwhile, in the programmable controller 100 of the present embodiment, when the external memory is connected to the external memory card slot 104, upon determining that the key information is not stored in the external memory and the external memory cannot be properly authenticated according to the key information and the lock information, the CPU 103 does not accept (inhibits) the control (operation) from the operation element (for example, the emergency stop switch 107 or the small switch group 108) of the programmable controller 100.

For example, when the CPU 103 cannot authenticate the second external memory 161 according to second key information 162 stored therein and the first lock information 102 stored in the nonvolatile memory 101 of the programmable controller 100 since the second lock information 162 is not for the programmable controller 100 but for a different programmable controller, the programmable controller 100 does not accept the control from the operation element (the emergency stop switch 107 or the small switch group 108, for example) while the second external memory 161 is connected to the external memory card slot 104.

That is, the user's operability and non-operability are switched by attachment/detachment of the external memory, that is, the attachment and detachment of the external memory functions as a lock switch in the programmable controller 100 of the present embodiment. As described above, along with the downsizing of the programmable controller 100, various kinds of switches become more compact, so that they are difficult to operate. In view of this, in the present embodiment, the attachment/detachment of the external memory functions as one operation means. Further, to prevent unauthorized operations to the programmable controller 100 with an external memory purchased by a third person, the authentication is performed on the basis of the key information stored in the external memory. This can accordingly improve the safety and operability of the programmable controller 100. Note that, in the present embodiment, the attachment/detachment of the external memory functions as a lock switch. However, a different function may be included.

Figure 3:
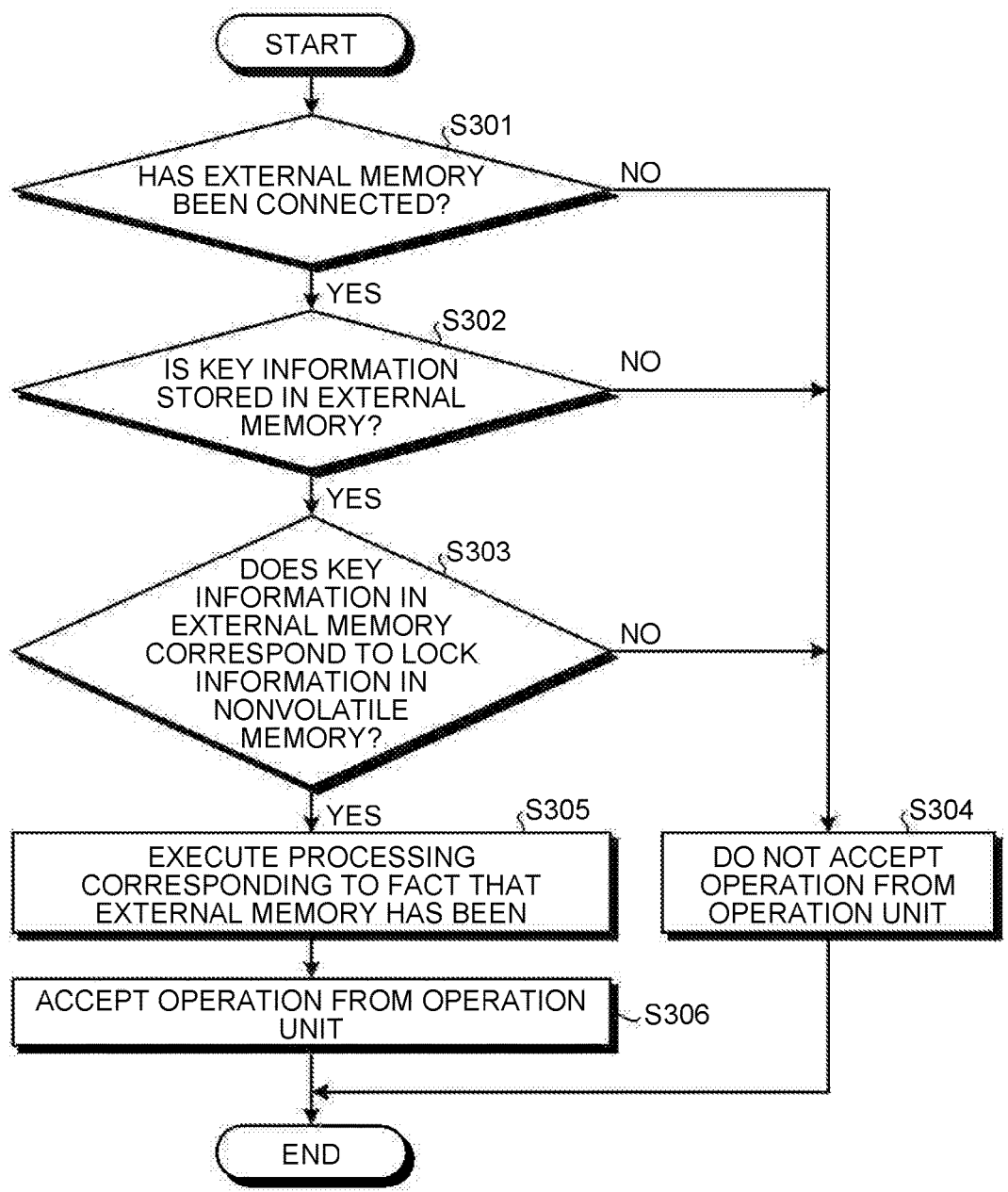
FIG. 3 is a flowchart of a process of connecting the external memory to the programmable controller according to the first embodiment.

Next, a process of connecting the external memory to the programmable controller 100 according to the present embodiment will be described. FIG. 3 is a flowchart of the above-described process in the programmable controller 100 according to the present embodiment.

First, the CPU 103 of the programmable controller 100 determines whether the external memory is connected to the external memory card slot 104 (step S301). When determining that the external memory is not connected (No in step S301), the CPU 103 proceeds to step S304.

Meanwhile, when determining that the external memory is connected to the external memory card slot 104 (Yes in step S301), the CPU 103 determines whether the key information is stored in the external memory (step S302). When determining that the key information is not stored (No in step S302), the CPU 103 proceeds to step S304.

Meanwhile, when determining that the key information is stored in the external memory connected to the external memory card slot 104 (Yes in step S302), the CPU 103 performs authentication of the external memory based on whether the key information stored in the external memory corresponds to the lock information stored in the nonvolatile memory 101 (step S303). When determining that the key information does not correspond to the lock information, in other words, the authentication has failed (No in step S303), the CPU 103 proceeds to step S304.

Then, in step S304, the CPU 103 controls the programmable controller 100 not to accept the operation (control) from the operation element (the emergency stop switch 107 or the small switch group 108, for example), and terminates the process.

Meanwhile, when determining that the key information corresponds to the lock information, in other words, the authentication has succeeded (Yes in step S303), the CPU 103 executes control of the programmable controller 100 in response to the connection with the external memory. In the present embodiment, the CPU 103 controls the programmable controller 100 to make the operation with the operation element available (step S305).

Accordingly, the CPU 103 starts accepting the operation (control) from the operation element (the emergency stop switch 107 or the small switch group 108, for example) (step S306).

Figure 4:
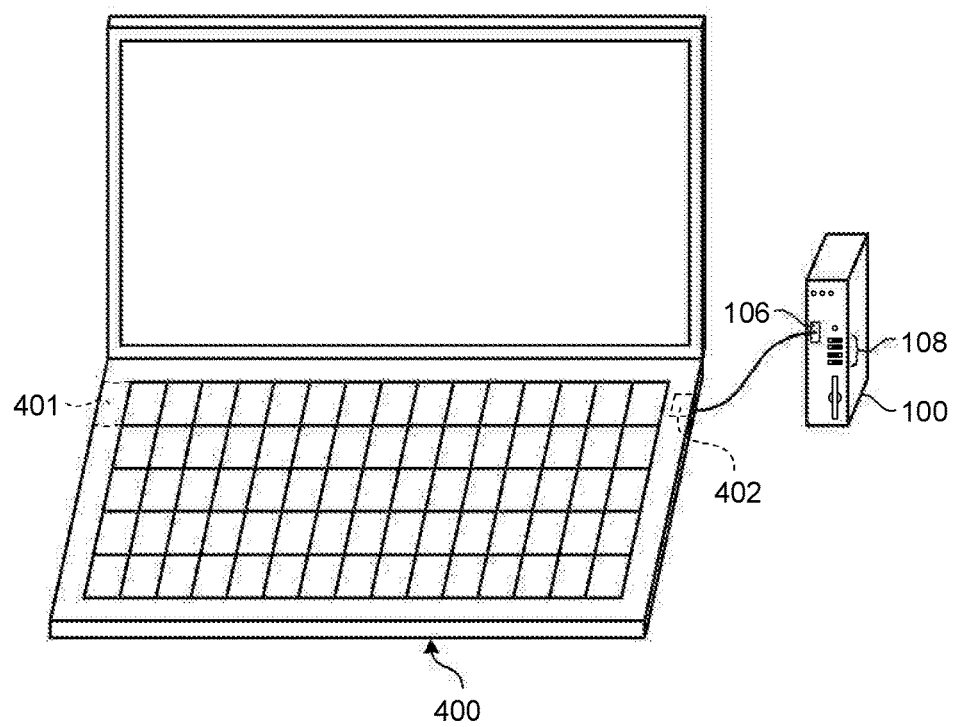
FIG. 4 is a diagram illustrating a concept in creating key information and lock information with an engineering tool according to the first embodiment.

Next, key information setting will be described. In the present embodiment, key information and lock information are created with an engineering tool to set the key information for using the programmable controller 100. FIG. 4 is a diagram illustrating a concept in creating the key information and the lock information with the engineering tool according to the present embodiment. As illustrated in FIG. 4, an engineering tool 400 includes a card slot 401 for connecting to the external memory, and a communication I/F 402 for connecting with the programmable controller 100. The engineering tool 400 contains a program distributed by a vendor of the programmable controller 100. Then, the engineering tool 400 executes the program to perform the following processing.

The engineering tool 400 generates the first lock information from unique values such as the serial number received from the programmable controller 100 or the MAC address when no lock information is stored in the nonvolatile memory 101 of the programmable controller 100, and writes the first lock information to the nonvolatile memory 101 of the programmable controller 100. Further, when the lock information is in the nonvolatile memory 101 or when having written the lock information thereto, the engineering tool 400 generates the first key information corresponding to the lock information and writes the first key information to the external memory connected to the card slot 401.

Further, the engineering tool 400 may write a plurality of items of key information corresponding to a plurality of programmable controllers to the external memory. Accordingly, the plurality of programmable controllers can be operated with one external memory.

Accordingly, the external memory usable in the programmable controller 100 can be generated. Note that the external memory can be generated with the programmable controller 100 in place of the engineering tool 400.

Further, the CPU 103 may start writing information on a device (information from a sensor) controlled by the programmable controller 100, triggered by the connection between the programmable controller 100 *h* and the external memory. Thereby, the user can recognize the state of the device to be controlled by the programmable controller 100. For example, the user can analyze the information written to the external memory to analyze an incorrectly operating sensor or a disconnection of a sensor in detail.

Second Embodiment

The first embodiment has described an example in which the control executed by the programmable controller when connected to the external memory is preset. However, the control executed by the programmable controller when connected to the external memory may be changed depending on the external memory. The present embodiment will describe an example of changing the control to be executed depending on a connected external memory will be described.

Figure 5:
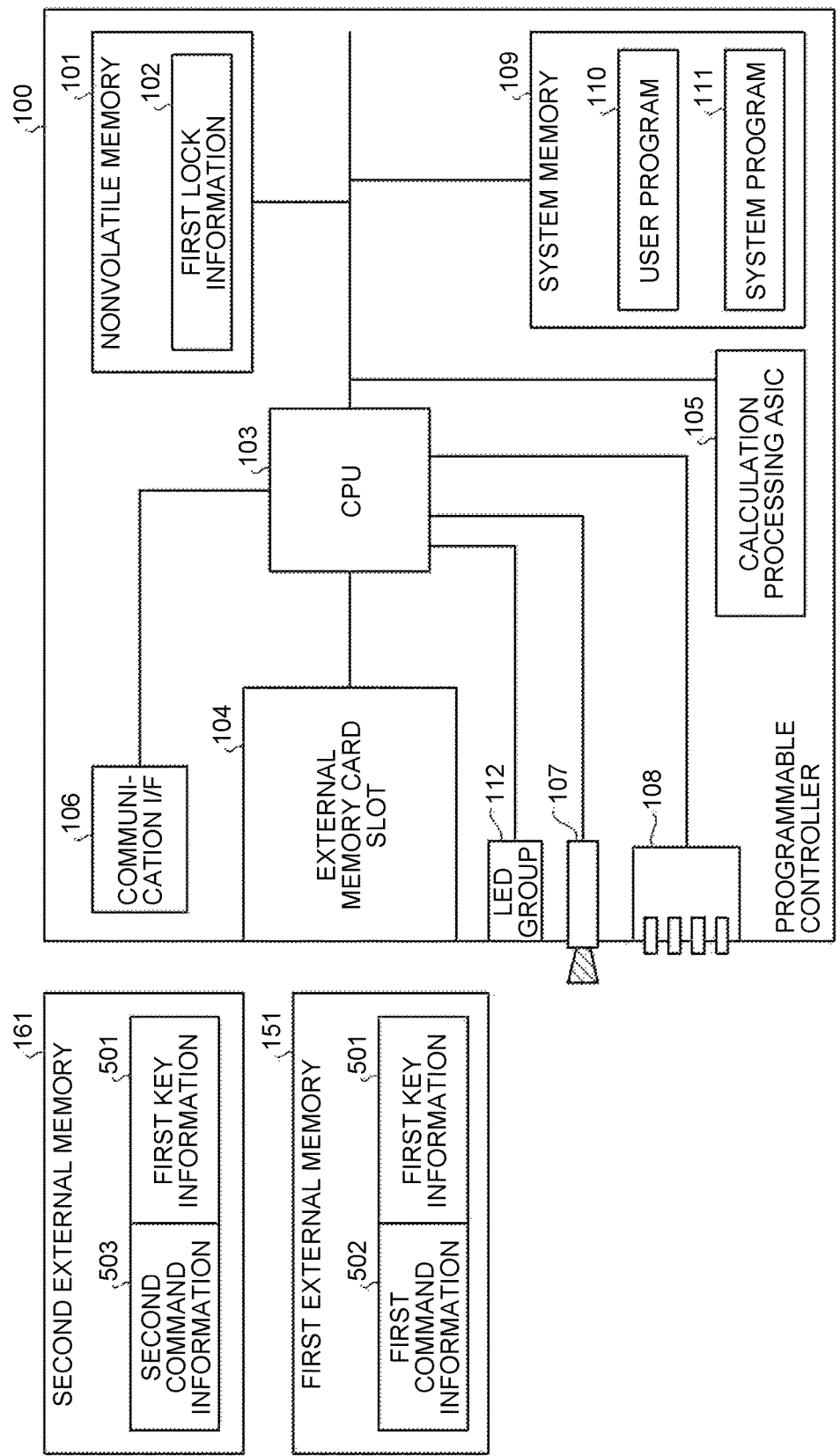
FIG. 5 is a block diagram illustrating the configurations of a programmable controller according to a second embodiment and an external memory.

FIG. 5 is a block diagram illustrating the configurations of a programmable controller according to a second embodiment and an external memory. In the following, the same or like elements as those in the first embodiment are denoted with the same or like reference signs, and a description thereof is omitted.

First command information 502 is stored in a first external memory 151 in association with first key information 501. The first command information 502 is a command executed by the programmable controller 100 when connected to the first external memory 151 and having authenticated the first external memory 151 on the basis of the first key information 501. The first command information can be a change in the setting of the programmable controller 100, for example.

Meanwhile, second command information 503 is stored in a second external memory 161 in association with the first key information 501. The second command information 503 is a command executed by the programmable controller 100 when connected to the second external memory 161 and having authenticated the second external memory 161 according to the first key information 501.

That is, when the first external memory 151 is connected to an external memory card slot 104 and the authentication is appropriate, the programmable controller 100 executes the first command information 502. When the second external memory 161 is connected to the external memory card slot 104 and the authentication is appropriate, the programmable controller 100 executes the second command information 503. Thus, a user can execute an intended control (command) over the programmable controller 100 by connecting an external memory corresponding to the intended control thereto. Thereby, irrespective of a small size of an operation element of the programmable controller 100, the user can perform a desired operation with the programmable controller 100.

Figure 6:
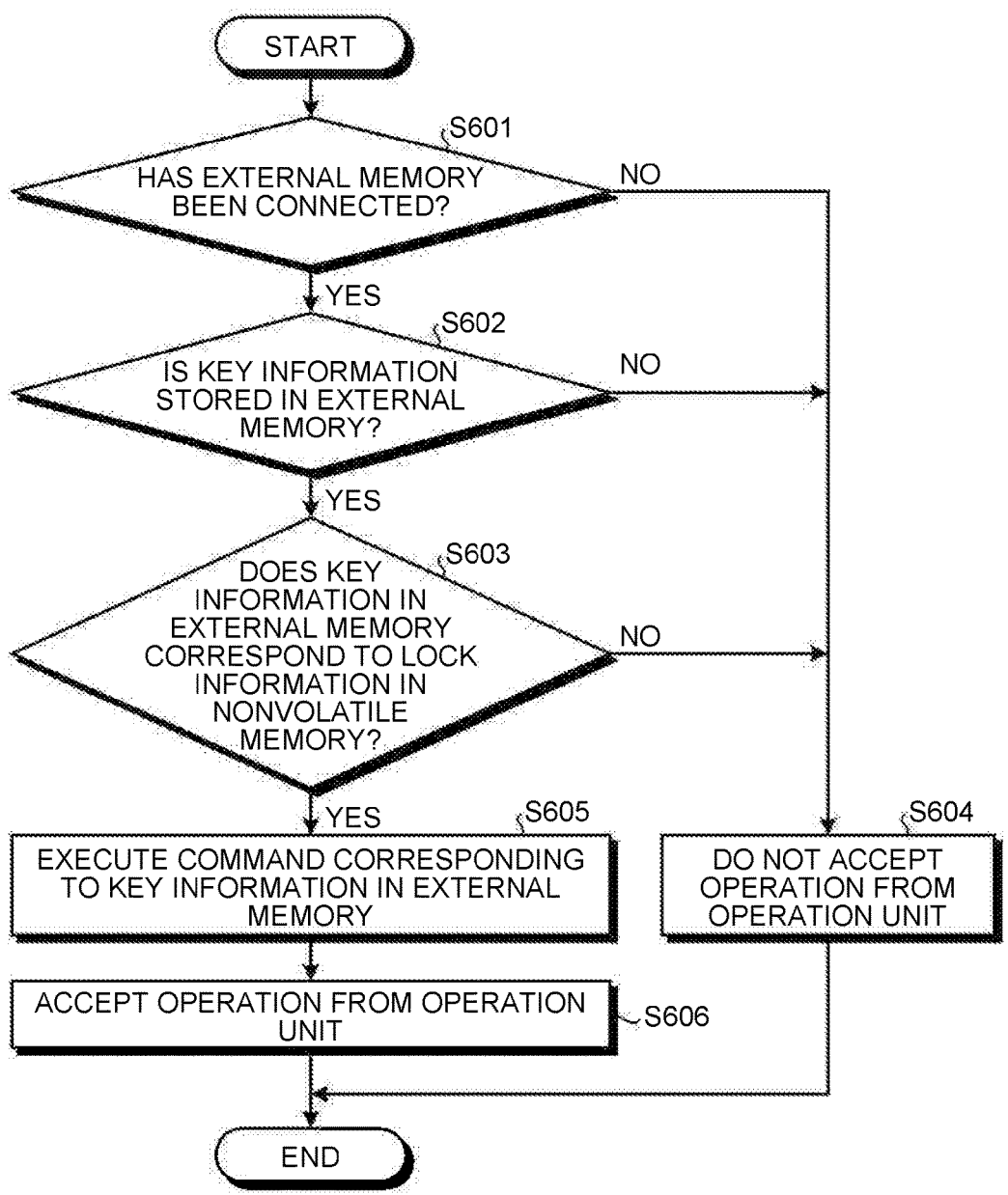
FIG. 6 is a flowchart of a process of connecting the external memory to the programmable controller according to the second embodiment.

Next, a process of connecting the external memory to the programmable controller 100 according to the present embodiment will be described. FIG. 6 is a flowchart of the above-described process in the programmable controller 100 according to the present embodiment.

First, similarly to steps S301 to S303 of FIG. 3 of the first embodiment, a CPU 103 proceeds to the steps to authenticate the external memory on the basis of whether the key information stored in the external memory corresponds to lock information stored in a nonvolatile memory 101 (steps S601 to S603). When determining that the key information does not correspond to the lock information, in other words, the authentication has failed (No in step S603), the CPU 103 proceeds to step S604.

Then, in step S604, the CPU 103 does not accept an operation (control) from an operation element (the emergency stop switch 107 or small switch group 108, for example), and terminates the process.

Meanwhile, when determining that the key information corresponds to the lock information, in other words, the authentication has succeeded (Yes in step S603), the CPU 103 executes the command information associated with the key information used in the authentication (step S605).

Then, the CPU 103 starts accepting the operation (control) from the operation element (the emergency stop switch 107 or the small switch group 108, for example) (step S606).

Figure 7:
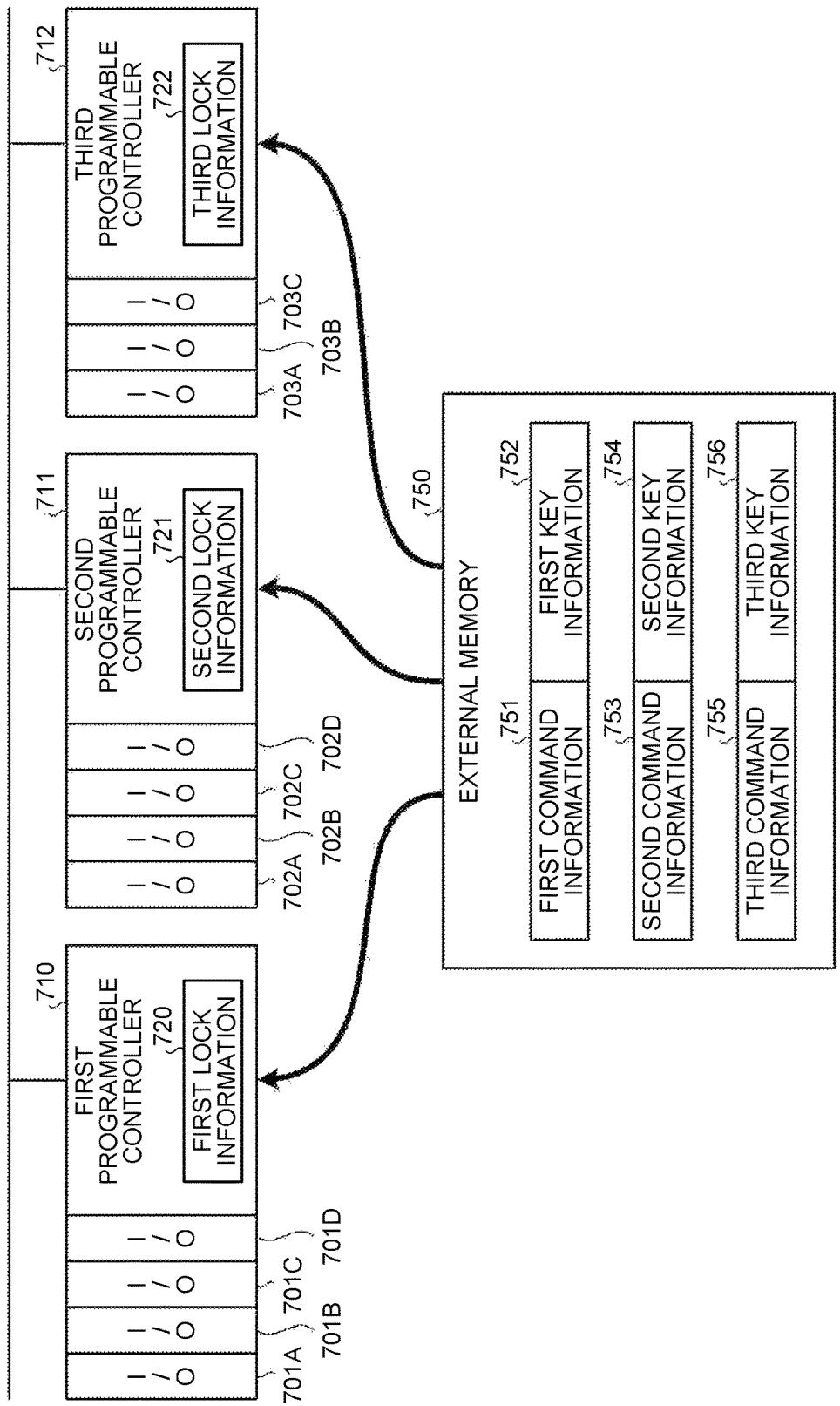
FIG. 7 is a diagram illustrating a concept of an external memory corresponding to a plurality of programmable controllers.

The amount of the key information to be stored in the external memory should not be limited to one item, and a plurality of items of key information may be stored for controlling a plurality of programmable controllers. FIG. 7 is a diagram illustrating a concept of an external memory corresponding to a plurality of programmable controllers. A control system illustrated in FIG. 7 includes a first programmable controller 710, a second programmable controller 711, and a third programmable controller 712.

Then, the first programmable controller 710 is connected to a plurality of interface devices (I/Os) 701A to 701D for controlling actuators. Further, the second programmable controller 711 is connected to a plurality of interface devices (I/Os) 702A to 702D for controlling actuators. Further, the third programmable controller 712 is connected to a plurality of interface devices (I/Os) 703A to 703C for controlling actuators.

Further, the first programmable controller 710 stores first lock information 720 in a nonvolatile memory. The second programmable controller 711 stores second lock information 721 in a nonvolatile memory. The third programmable controller 712 stores third lock information 722 in a nonvolatile memory.

Then, an external memory 750 stores first key information 752 corresponding to the first lock information 720, second key information 754 corresponding to the second lock information 721, and third key information 756 corresponding to the third lock information 722. Accordingly, the external memory 750 can properly authenticate each of the first programmable controller 710 to the third programmable controller 712 when connected thereto.

Then, each of the programmable controllers 710 to 712 when connected with the external memory 750 executes command information associated with the key information used in the authentication. That is, the first programmable controller 710 executes first command information 751, the second programmable controller 711 executes second command information 753, and the third programmable controller 712 executes third command information 755.

Accordingly, for performing a task with the plurality of programmable controllers, the user stores in advance a command corresponding to the task to be performed with each of the programmable controllers in the external memory in association with the key information corresponding to each of the programmable controllers. Thereby, the task can be performed when the external memory is connected to each of the programmable controllers, making it possible to reduce a user's workload.

In the second embodiment, the external memory is configured to store the operation that conventionally requires switching settings of small switches. Thereby, the operation in question can be implemented by simply connecting the external memory to the programmable controller, which results in preventing a user's erroneous operation.

Third Embodiment

The second embodiment has described an example of storing the commands corresponding to the respective programmable controllers in the external memory. However, information stored in the external memory in association with the key information should not be limited to the command information. Third embodiment will describe storing a system program by way of example.

Figure 8:
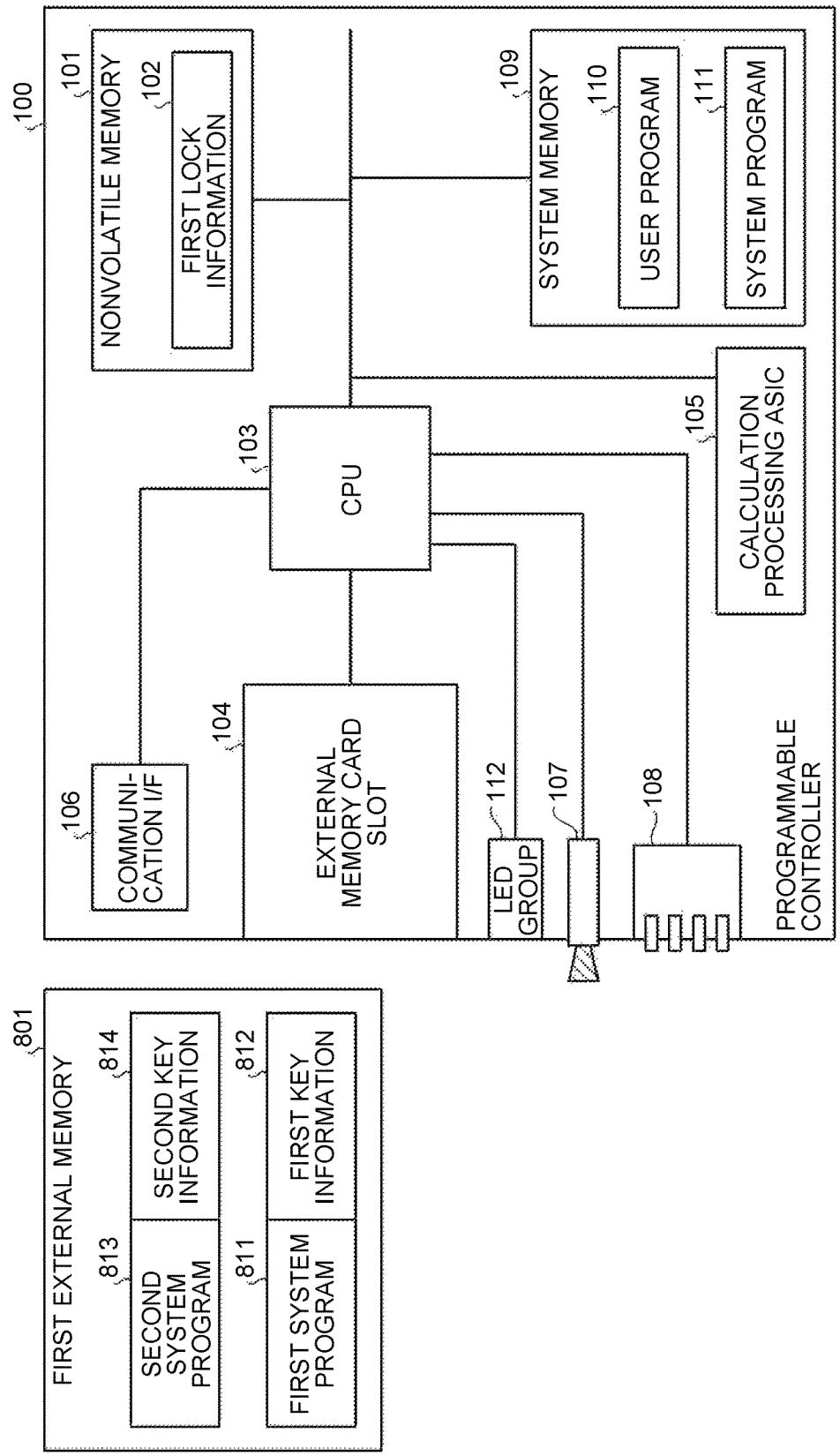
FIG. 8 is a block diagram illustrating the configurations of a programmable controller according to a third embodiment and an external memory.

FIG. 8 is a block diagram illustrating the configurations of a programmable controller according to the third embodiment and an external memory. In the following, the same or like elements as those in the first embodiment are denoted with the same or like reference signs, and a description thereof is omitted.

A first external memory 801 stores a first system program 811 and a second system program 813 in association with first key information 812 and second key information 814, respectively. The first system program 811 is a system program to be updated on a programmable controller 100 when connected with the external memory 801. The second system program 813 is a system program to be updated on another programmable controller different from the programmable controller 100, when connected with the external memory 801.

In the programmable controller 100 in the present embodiment, when the key information used in the authentication and the system program are associated with each other, the CPU 103 updates a system program stored in a system memory 109 to the associated system program.

Meanwhile, in a control system, programmable controllers are connected to different machines so that the system programs to be updated on the programmable controllers may differ from each other. Even in such a case, each of the programmable controllers can update the corresponding system program by storing a system program in the external memory 801 in association with the key information corresponding to the programmable controller. Further, a user can simply connect the external memory 801 to the programmable controller and thus reduce his or her workload.

Next, a process of connecting the external memory to the programmable controller 100 according to the present embodiment will be described. FIG. 9 is a flowchart of the process in the programmable controller 100 according to the present embodiment.

First, similarly to steps S301 to S303 of FIG. 3 in the first embodiment, the CPU 103 proceeds to the steps to authenticate the external memory based on whether the key information stored in the external memory corresponds to lock information stored in a nonvolatile memory 101 (steps S901 to S903). When determining that the key information does not correspond to the lock information, in other words, the authentication has failed (No in step S903), the CPU 103 terminates the process.

Meanwhile, when determining that the key information corresponds to the lock information, in other words, the authentication has succeeded (Yes in step S903), the CPU 103 updates the system memory 109 with the system program associated with the key information used in the authentication (step S904).

Accordingly, the present embodiment can facilitate the maintenance of the programmable controller because the system program is updated when connected to the external memory. Further, similarly to the second embodiment, the plurality of system programs corresponding to the plurality of programmable controllers is stored in the external memory, so that the maintenance of the programmable controllers can be carried out with one external memory.

Modification of Third Embodiment

The third embodiment has described an example of updating a system program to the system program associated with the key information. However, it should not be limited to the update with the system program associated with the key information. In a modification, execution of a system program associated with key information will be described by way of example.

In the modification, when connected with a first external memory 801, the CPU 103 executes a first system program 811 stored in a first external memory 801 instead of the system program 111 stored in the system memory 109. Thereby, a user can switch a program to be executed by connecting the external memory 801 to the programmable controller.

In the third embodiment and its modification, only the system program associated with the key information corresponding to the programmable controller can be executed. By the execution of the system program when the external memory is attached or detached, various functions conventionally implemented by the combination of switch numbers, such as user program update, a simulation mode, a log function, and online update in addition to the system program update can be implemented. As described above, the maintenance of individual programmable controllers can be carried out with one external memory.

In the above-described embodiment, an operation to the programmable controller can be implemented by the attachment/detachment of the external memory. This can abate a user's workload.

Further, currently, system configurations are complex and sophisticated and one control system includes multiple programmable controllers. Therefore, a system personnel needs to maintain the system through different operation procedures to the individual programmable controllers. Therefore, conventionally, a system maintenance personnel has to perform complicated operations, which makes the maintenance difficult. Because of this, a problem arises that the maintenance personnel requires long man-hours to do the maintenance work.

In contrast, in the above-described embodiment, a command to be executed by the programmable controller is associated with the key information of the programmable controller. Thereby, the command is executed when the external memory is connected to the programmable controller. Therefore, the maintenance work can be facilitated.

Conventionally, the smaller the programmable controllers in size, the wider the variety of applications to which the programmable controllers are applied. Therefore, in recent years they have been progressively downsized. Further, in the programmable controller incorporating a switch group and an LED that indicates a state of the device, switches need to be arranged with an narrower interval, which makes it difficult for a user to operate.

In contrast, the programmable computer of the above-described embodiment is configured to be able to accept a user's operation as long as it is connected with the external memory, which can prevent a user's erroneous operation.

Further, the operation of the programmable controller can be implemented by the simple attachment/detachment of the external memory, which can reduce a user's workload. Further, an erroneous operation to the downsized programmable controller can be prevented, which leads to preventing a malfunction of the programmable controller accordingly.

Furthermore, the external memory is authenticated on the basis of the key information stored therein. Thereby, the programmable controller can improve safety.

Some embodiments of the present invention have been described. However, these embodiments are merely presented as examples, and are not intended to limit the scope of the invention. These novel embodiments can be implemented in various forms, and various omissions, replacements, and changes can be performed without departing from the gist of the invention. These embodiments and modification are included in the scope and the gist of the invention and are further included in the invention described in claims and its equivalents.

The invention claimed is:

1. A programmable controller comprising:
a connection interface connectable with an external storage;
a storage that stores information for authentication;
an emergency stop operation element, the emergency stop operation element being a hardware switch set on a surface of the programmable controller; and
a controller that makes an emergency stop control from the emergency stop operation element acceptable over the programmable controller when the external storage has been authenticated based on identification information stored in the external storage and the information for authentication, when the external storage has been connected to the connection interface,
wherein the controller further controls the programmable controller corresponding to a fact that the external storage has been connected when the external storage is authenticated,
wherein the controller further executes a command stored in the external storage when the external storage is authenticated based on the identification information stored in the external storage and the information for authentication, when the external storage storing the command is connected to the connection interface, and
wherein the controller further executes the command associated with the identification information corresponding to the programmable controller is stored in the external storage, when the external storage is authenticated based on one of a plurality of items of the identification information, and the information for authentication, when the external storage is connected to the connection interface, the external storage storing the plurality of items of identification information corresponding to a plurality of programmable controllers, the one being corresponding to the programmable controller.

2. The programmable controller according to claim 1, wherein the controller does not accept the emergency stop control from the emergency stop operation element when the identification information is not stored in the external storage or when the external storage is not authenticated based on the identification information and the information for authentication, when the external storage is connected to the connection interface.

3. The programmable controller according to claim 1, further comprising:
   a communication interface communicable with an external programming device, wherein
   the storage stores the information for authentication received through the communication interface from the external programming device that writes the identification information to the external storage.

* * * * *